(12) United States Patent
Schinabeck et al.

(10) Patent No.: US 7,732,548 B2
(45) Date of Patent: Jun. 8, 2010

(54) WATER-SOLUBLE SULFONIC GROUP-CONTAINING COPOLYMERS AND TERPOLYMERS THE PRODUCTION THEREOF AND WATER-BASED PAINTING AND COATING SYSTEMS

(75) Inventors: Michael Schinabeck, Garching (DE); Stefan Friedrich, Garching (DE); Irene Gattinger, Karlsfeld (DE); Andreas Tselibidis, Anning (DE); Gerhard Albrecht, Tacherting (DE); Alfred Kern, Kirchweidach (DE)

(73) Assignee: Construction Research & Technology GmbH, Trostberg (DE)

( * ) Notice: Subject to any disclaimer, the term of this patent is extended or adjusted under 35 U.S.C. 154(b) by 912 days.

(21) Appl. No.: 10/572,993

(22) PCT Filed: Oct. 18, 2004

(86) PCT No.: PCT/EP2004/011786

§ 371 (c)(1),
(2), (4) Date: Mar. 23, 2006

(87) PCT Pub. No.: WO2005/035603

PCT Pub. Date: Apr. 21, 2005

(65) Prior Publication Data

US 2007/0083020 A1    Apr. 12, 2007

(30) Foreign Application Priority Data

Oct. 18, 2003    (DE) .................. 103 48 502

(51) Int. Cl.
*C08F 228/02*    (2006.01)
*C08F 120/56*    (2006.01)
(52) U.S. Cl. ............... 526/288; 526/287; 526/292.95; 526/303.1; 526/307; 526/307.2; 526/307.4
(58) Field of Classification Search ......... 526/287, 526/288, 292.95, 303.1, 307, 307.2, 307.4
See application file for complete search history.

(56) References Cited

U.S. PATENT DOCUMENTS

| | | |
|---|---|---|
| 6,187,887 B1 | 2/2001 | Albrecht et al. |
| 6,277,900 B1 | 8/2001 | Oswald et al. |
| 6,395,853 B1 | 5/2002 | Oswald et al. |
| 7,238,760 B2 * | 7/2007 | Schinabeck et al. ......... 526/288 |
| 2004/0024154 A1 | 2/2004 | Schinabeck et al. |

FOREIGN PATENT DOCUMENTS

| | | |
|---|---|---|
| DE | 197 52 093 A1 | 7/1999 |
| DE | 198 06 482 A1 | 8/1999 |
| DE | 100 37 629 A1 | 2/2002 |

* cited by examiner

*Primary Examiner*—Helen L. Pezzuto
(74) *Attorney, Agent, or Firm*—Fulbright & Jaworski LLP

(57) ABSTRACT

Water-soluble copolymers and terpolymers as stabilizers for aqueous building material systems and water-based paint and coating systems are described. Advantages of the copolymers and terpolymers used according to the invention compared to conventional products are firstly the very good stabilizing properties of the building material systems or water-based paint and coating systems produced correspondingly and secondly the fact that the viscosity of the systems is barely increased, so that these have excellent processability.

10 Claims, 2 Drawing Sheets

Figure 1:
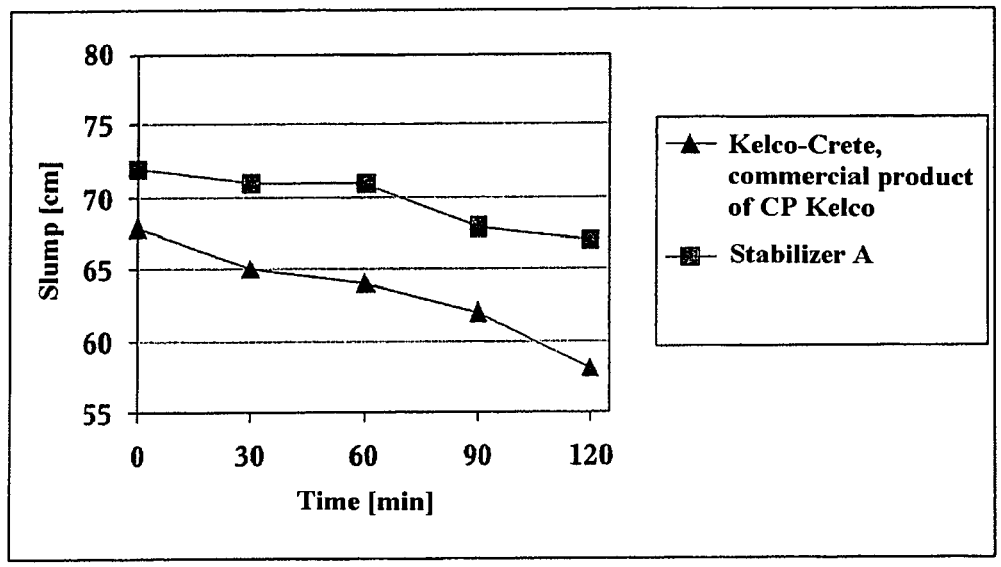

Slump as a function of time for the formulations of Example 1.

Slump as a function of time for the formulations of Example 2.

Slump as a function of time for the formulations of Example 5.

WATER-SOLUBLE SULFONIC GROUP-CONTAINING COPOLYMERS AND TERPOLYMERS THE PRODUCTION THEREOF AND WATER-BASED PAINTING AND COATING SYSTEMS

This is a 371 of PCT/EP2004/011786 filed Oct. 18, 2004, which claims priority from German Patent Application No. 103 48 502.3 filed Oct. 18, 2003.

The present invention relates to the use of water-soluble copolymers and terpolymers containing sulfo groups as stabilizers for aqueous building material systems based on hydraulic binders such as cement, lime, gypsum plaster, anhydrite, etc., and also in water-based paint and coating systems.

The addition of additives to hydraulic or latently hydraulic binders such as cement or gypsum plaster is known. An important group of additives is, for example, that of fluidizers. These aid processability and, in particular, improve the flowability. However, in the case of highly fluid mixtures, the tendency for relatively heavy constituents to segregate and for bleed water to separate out on the surface is significantly increased. This has adverse effects on the processability and the solids properties of the cured building material mixture. For this reason, stabilizers (also known as antisegregation agents, antibleeding agents or viscosity modifiers) are used in order to prevent these undesirable effects. Water-soluble nonionic derivatives of polysaccharides, in particular cellulose and starch derivatives, are usually used in aqueous building material mixtures. However, microbially produced polysaccharides such as welan gum are also used according to the prior art for preventing undesirable segregation and the formation of bleed water.

The use of nanosilica slurries as stabilizers, especially in concrete, is also known. However, the nanosilica slurries (usually having a solids content of 20% by weight) have to be added in very large amounts.

Furthermore, they are not stable (sedimentation of silica) and have to be rehomogenized by means of complicated stirring apparatuses prior to use.

The additives based on water-soluble nonionic derivatives of polysaccharides and also microbially produced polysaccharides display some critical disadvantages when used in aqueous building material systems:

- the antisegregation and antibleeding properties are achieved, in particular, by a thickening (viscosity increase) of the building material mixture, which has an adverse effect on the flow properties and thus the processability.
- for particular building material applications (especially concrete), the use of the additives in the form of aqueous solutions is necessary. However, the preparation of aqueous solutions of the known additives is difficult, since, for example, cellulose ethers are not readily soluble at low and high temperatures and sometimes flocculate. In addition, the (storage) stability is not satisfactory because of degradation reactions over time (bacterial attack).
- many cellulose derivatives used in the building materials industry retard setting.

In water-based paint and coating systems, too, polysaccharide derivatives, in particular, are used according to the prior art to prevent settling, e.g. of the pigments. Here, problems with the storage stability of the mixtures likewise occur because of microbial attack.

In the literature, synthetic polymers having stabilizing properties have hitherto been described predominantly as additives in drilling muds and in the cementing of boreholes. There, they serve to reduce the loss of water from cement slurries into the surrounding rock formation. Thus, for example, DE 29 31 897 A1, DE 40 34 642 A1, DE 199 26 355 A1 and DE 197 52 093 C2 propose copolymers or terpolymers based on 2-acrylamido-2-methylpropanesulfonic acid as auxiliaries in the cementing of boreholes. These polymers are optimized for the specific requirements for use in a borehole. When used in building material mixtures such as mortar and concrete or in water-based paint and coating systems, they display disadvantages for the user, since either the flow properties are restricted too greatly or formation of bleed water is not prevented.

In JP 10053627, terpolymers of N-vinylacetamide, 2-acrylamido-2-methylpropanesulfonic acid and acrylonitrile are described as stabilizers for concrete having a high flowability. Although these terpolymers display a good stabilizing action, they are unable to prevent the formation of bleed water. In addition, the price/perform ratio is considerably poorer compared to cellulose ethers, since the N-vinylacetamide used is a very expensive monomer, so that the user is faced with a considerable economic disadvantage.

DE 198 06 482 A1 and DE 100 37 629 A1 describe quaternary polymers containing sulfo groups which display very good water-retaining properties. In addition, they also have a very good stabilizing action due to the fact that they greatly increase the plastic viscosity of the mixture. However, this high degree of thickening restricts the processability of the building material mixture or of the water-based paint and coating system to an extent which is unacceptable to the user. Although addition of fluidizers or increasing the amount of fluidizers added can reduce the plastic viscosity again, the additional costs incurred for the fluidizer represent a considerable economic disadvantage for the user.

In the case of pumped building material systems (e.g. pumped concrete, cement or calcium sulfate flow screeds), the segregation of coarse aggregates is a frequently occurring problem. Settling of, in particular, the gravel results in blockages in the hoses, which leads to considerable time delays and thus additional costs. The quaternary polymers containing sulfo groups which are described in DE 198 064 82 A1 and DE 100 37 629 A1 display good properties for this application as pumping aids, too, since they prevent segregation of the aggregates. However, the thickening of the concrete caused by the added polymers causes a significant increase in the pump pressure, which results in increased pump wear and thus incurs considerable consequential costs.

It is therefore an object of the present invention to provide inexpensive stabilizers for aqueous building material systems and water-based paint and coating systems, which stabilizers do not have the abovementioned disadvantages of the prior art but display an excellent stabilizing action and at the same time do not increase the viscosity of the system too greatly, so that the processability is not adversely affected or, in the case of pumped building material mixtures, the pump pressure is not significantly increased. Furthermore, the copolymers or terpolymers should be highly effective in terms of the amount added, introduce no retardation of setting, display very good storage stability over time in aqueous solution and be compatible with other additives.

This object is achieved according to the invention by the water-soluble copolymers and terpolymers which contain sulfo groups and comprise the structural groups a) and also b) and/or c) as set forth in claim 1.

It has surprisingly been found that these products have excellent effectiveness at a significantly lower added amount compared to conventional stabilizers. In addition, they do not significantly increase the viscosity of the building material mixture or of the water-based paint and coating system, so that no adverse effect on the processability is observed.

When used as pumping aid in building material systems (e.g. pumped concrete, cement or calcium sulfate flow screed), a very good stabilizing action is also found without the pump pressure being significantly increased, which represents a further considerable advantage for the user.

Furthermore, the aqueous solutions of the copolymers and terpolymers have a very good storage stability, which likewise results in a considerable advantage in practice when they are used, for example, in concrete.

The polymers of the invention comprise at least two structural groups a), b) and/or c).

The first structural group a) is a substituted acrylic or methacrylic derivative containing sulfo groups and having the formula I:

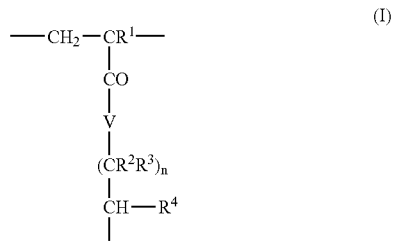

where $R^1$=hydrogen or methyl, $R^2$, $R^3$, $R^4$=hydrogen, an aliphatic hydrocarbon residue having from 1 to 6 carbon atoms, a phenyl residue which may be unsubstituted or substituted by methyl groups, V=NH or oxygen and M=hydrogen, a monovalent or divalent metal cation, ammonium or an organic amine residue, n=1 to 5 and a=½ or 1. As monovalent or divalent metal cation, preference is given to using sodium, potassium, calcium or magnesium ions. As organic amine residue, preference is given to using substituted ammonium groups derived from primary, secondary or tertiary $C_1$-$C_{20}$-alkylamines, $C_1$-$C_{20}$-alkanolamines, $C_5$-$C_8$-cycloalkylamines and $C_6$-$C_{14}$-arylamines. Examples of corresponding amines are methylamine, dimethylamine, trimethylamine, ethanolamine, diethanolamine, triethanolamine, cyclohexylamine, dicyclohexylamine, phenylamine as well as diphenylamine in the protonated ammonium form.

The structural group a) is derived from monomers such as 2-acrylamido-2-methylpropanesulfonic acid, 2-methacrylamido-2-methylpropanesulfonic acid, 2-acrylamido-butanesulfonic acid, 3-acrylamido-3-methylbutanesulfonic acid, 2-acrylamido-2,4,4-trimethylpentanesulfonic acid, 3-(methacryloyloxy)propanesulfonic acid.

Particular preference is given to 2-acrylamido-2-methylpropanesulfonic acid.

Optionally, up to 50 mol % of the structural groups a) can be replaced by further structural units which contain sulfonic acid groups and are derived from methallylsulfonic acid or allylsulfonic acid monomers.

The second structural group b) corresponds to the formula II:

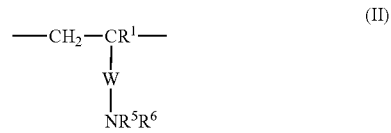

where W=—CO—O—$(CH_2)_x$—, —CO—$NR^2$—$(CH_2)_x$—, x=1 to 6 and $R^1$ and $R^2$ are as defined above.

$R^5$ and $R^6$ are each, independently of one another, hydrogen, an aliphatic hydrocarbon residue having from 1 to 20 carbon atoms, a cycloaliphatic hydrocarbon residue having from 5 to 8 carbon atoms or an aryl residue having from 6 to 14 carbon atoms. These residues may be optionally substituted by hydroxyl, carboxyl or sulfonic acid groups.

As monomers which form the structure (II), preference is given to the following compounds: [3-(methacryloylamino) propyl]dimethylamine, [3-(acryloylamino)propyl]-dimethylamine, [2-(methacryloyloxy)ethyl]dimethylamine, etc.

The third structural group c) rresponds to the formula III

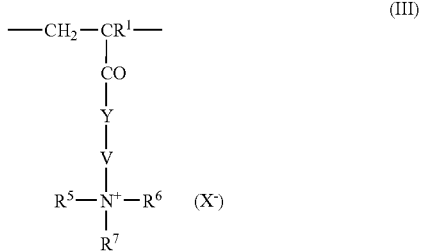

where
Y=O, NH or $NR^5$,
V=—$(CH_2)_x$—,

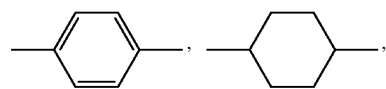

$R^7$=$R^5$ or $R^6$, —$(CH_2)_x$—$SO_3^{\ominus}Ma$,

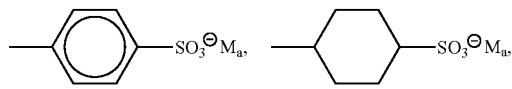

X=halogen (preferably Cl, Br), $C_1$-$C_4$-alkylsulfate (preferably methylsulfate) or $C_1$-$C_4$-alkylsulfonate and
$R^1$, $R^5$, $R^6$, M, a and x are as defined above.

As monomers which form the structure (III), preference is given to the following compounds: [2-(acryloyloxy)-ethyl] trimethylammonium chloride, [2-(acryloylamino)-ethyl]trimethylammonium chloride, [2-(acryloyloxy)-ethyl]trimethylammonium methosulfate, [2-(methacryloyloxy)ethyl] trimethylammonium chloride or methosulfate, [3-(methacryloylamino)propyl]trimethylammonium chloride, N-(3-sulfopropyl)-N-methylacryloxyethyl-N',N-dimethylammonium betaine, N-(3-sulfopropyl)-N-methylacrylamidopropyl-N,N-dimethylammonium betaine and 1-(3-sulfopropyl)-2-vinylpyridinium betaine.

It is also possible for the purposes of the present invention for up to 50 mol % of the structural groups a), b) or c) to be replaced by structural units derived from acrylamide or N,N-dimethylacrylamide monomers.

If appropriate, the copolymers and terpolymers can additionally be given a lightly branched or crosslinked structure by incorporation of small amounts of crosslinkers. Examples of such crosslinker components are triallylamine, triallylmethylammonium chloride, tetraallylammonium chloride and N,N'-methylenebisacrylamide. These compounds must be used only in such amounts that water-soluble copolymers and terpolymers are still always obtained. In general, the concentration will rarely be above 0.1 mol %, but a person skilled in the art can easily determine the maximum usable amount of crosslinker component.

It is important for the invention that the copolymers or terpolymers comprise from 3 to 96 mol % of the structural group a), from 3 to 96 mol % of the structural group b) and/or from 0.05 to 75 mol % of the structural group c). Preferably used polymers comprise from 40 to 80 mol % of a), from 10 to 55 mol % of b) and/or from 2 to 30 mol % of c).

For the purposes of the present invention, it has been found to be particularly advantageous for the mole fraction of the structural group c) to be at least 5 mol % lower than the mole fraction of the structural group a).

The copolymers of the invention are prepared in a manner known per se by linking of the monomers forming the structures a) to c) by free-radical, ionic or complex-coordinative bulk, solution, gel, emulsion, dispersion or suspension polymerization. Since the products according to the invention are water-soluble copolymers, polymerization in aqueous phase, reverse emulsion polymerization or inverse suspension polymerization is preferred. In particularly preferred embodiments, the reaction is carried out as a gel polymerization in the aqueous phase.

In the preferred gel polymerization, it is advantageous for the polymerization to be carried out at low reaction temperatures using a suitable initiator system. The combination of two initiator systems (azo initiators and redox system), which are firstly initiated photochemically at low temperatures and subsequently initiated thermally as a result of the exothermic nature of the polymerization, enables a conversion of >=99% to be achieved.

Other auxiliaries such as molecular weight regulators, e.g. thioglycolic acid, mercaptoethanol, formic acid and sodium hypophosphite can likewise be used.

The work-up of the gel block is made easier by the use of a release agent (e.g. Sitren 595 from Goldschmidt), which prevents conglutination of the gel granules. The free-flowing gel particles are therefore easier to distribute over a drying mesh. As a result, the drying process is assisted and it is even possible to reduce the drying times.

The gel polymerization is preferably carried out at from −5 to 50° C., with the concentration of the aqueous solution preferably being set to from 40 to 70% by weight. To carry out the polymerization according to a preferred embodiment, the (meth)acrylic derivative containing sulfo groups in the form of its commercially available acid form is dissolved in water, neutralized by addition of an alkali metal hydroxide, and mixed while stirring with further monomers to be used according to the invention and with buffers, molecular weight regulators and polymerization auxiliaries. After setting the polymerization pH, which is preferably in the range from 4 to 9, the mixture is purged with a protective gas such as helium or nitrogen and is subsequently heated or cooled to the appropriate polymerization temperature. If unstirred gel polymerization is chosen as embodiment, the polymerization is carried out in preferred layer thicknesses of from 2 to 20 cm, in particular from 8 to 10 cm, under adiabatic reaction conditions. The polymerization is initiated by addition of the polymerization initiator and by irradiation with UV light at low temperatures (from −5 to 10° C.). After complete conversion of the monomers, the polymer is comminuted with addition of a release agent (e.g. Sitren 595 from Goldschmidt) to accelerate drying as a result of a larger surface area.

The very gentle reaction and drying conditions enable crosslinking secondary reactions to be avoided, so that polymers which have a very low gel content are obtained.

The copolymers or terpolymers of the invention preferably have a number average molecular weight $M_n$ of from 50 000 to 20 000 000 g/mol and are very suitable as additives for aqueous building material systems comprising hydraulic binders such as cement, lime, gypsum plaster, anhydrite, etc. Furthermore, they can be employed in water-based paint and coating systems.

The copolymers or terpolymers of the invention are preferably used in amounts of, depending on the type of application, from 0.01 to 5% by weight, based on the dry weight of the building material system, paint system or coating system.

The dried copolymers are passed to their use according to the invention in powder form for dry mortar applications (e.g. grouting mortar, flow screeds based on calcium sulfate). In the case of concrete, on the other hand, additives in general and also stabilizers are especially preferably used in the form of aqueous solutions. Here, the viscosity of the stabilizer solutions must not be above about 1000 mPa*s, since handling by the user is otherwise made unreasonably difficult.

The polymers of the invention can readily be dissolved in water, and in all cases give a solution viscosity of less than 1000 mPa*s at a concentration of 1 mol % (cf. Table 2). For reasons of logistics (storage, etc.), a very high active content of the aqueous stabilizer solution is advantageous for the user. However, at a polymer content of 2 mol %, the solutions have viscosities which are significantly above 1000 mPa*s (cf. Table 2) and are thus disadvantageous for the user owing to high viscosity. Addition of 1 mol % of a salt makes it possible to obtain viscosities which are in all cases once again below 1000 mPa*s.

To achieve this effect, it is possible to use alkali metal salts and alkaline earth metal salts of mineral acids but also of simple organic acids such as formic acid or acetic acid. However, particular salts such as halides or nitrates would be disadvantageous for the user, since they result in negative properties, especially in terms of the durability of the concrete. The use of alkali metal sulfates, particularly preferably sodium sulfate, is therefore preferred.

The copolymers and terpolymers have excellent stabilizing properties even when added in small amounts and give pigment-containing paints, plasters and renders, adhesive mortars, knifing fillers, grouting compounds, spray concrete, flow concrete, self-compacting concrete, underwater concrete, underwater mortar, etc., excellent use properties both in terms of processing and in the cured or dried state. In these cases, the viscosity of the building material mixture is not significantly affected by addition of the copolymers or terpolymers, so that processability is not impaired. In addition, the aqueous solutions of the copolymers and terpolymers of the invention have a very good storage stability.

Water-soluble copolymers and terpolymers are described as stabilizers for aqueous building material systems and water-based paint and coating systems. Advantages of the copolymers and terpolymers used according to the invention compared to conventional products are firstly the very good stability properties of the correspondingly produced building material systems and water-based paint and coating systems and secondly the fact that the viscosity of the systems is barely increased, so that these have excellent processability.

The following examples illustrate the invention.

EXAMPLES

Example A1

Stabilizer A 400 g of water are placed in a 1 l three-necked flask provided with a stirrer and thermometer. While stirring, 87 g of sodium hydroxide pellets were dissolved and 450 g (2.17 mol; 75 mol %) of 2-acrylamido-2-methylpropanesulfonic acid were added slowly, and the mixture was stirred until a clear solution was obtained. After addition of 0.50 g of citric acid hydrate, 5% by weight aqueous sodium hydroxide solution was added while stirring and cooling to set a pH of 4.60. 331.5 g (0.72 mol; 25 mol %) of [2-(methacrylamido)propyl]trimethylammonium chloride (50% by weight solution in water) were subsequently added. The solution was brought to a pH of 6.0 by means of 20% aqueous sodium hydroxide solution and was made inert by purging with nitrogen for 30 minutes and cooled to about 5° C. The solution is transferred to a plastic container having the dimensions (w*d*h) of 15 cm*10 cm*20 cm and 150 mg of 2,2'-azobis(2-amidinopropane) dihydrochloride, 1.0 g of 1% Rongalit solution and 10 g of 0.1% tert-butyl hydroperoxide solution are subsequently added in succession. The polymerization is initiated by irradiation with UV light (two Philips tubes; Cleo Performance 40 W). After about 2-3 hours, the hard gel is taken from the plastic container and cut by means of scissors into gel cubes having dimensions of about 5 cm*5 cm*5 cm. Before the gel cubes are comminuted by means of a conventional meat grinder, they are painted with the release agent Sitren 595 (polydimethylsiloxane emulsion from Goldschmidt). The release agent is a polydimethylsiloxane emulsion which has been diluted in a ratio of 1:20 with water.

The gel granules obtained are distributed uniformly on drying mesh and are dried to constant weight at about 90-120° C. under vacuum in a convection drying oven.

About 600 g of white, hard granules were obtained, and these were converted into a pulverulent state by means of a centrifugal mill.

Example A2

Stabilizer B

Using a procedure corresponding to Example 1, the stabilizer B was prepared as a terpolymer from 65 mol % of 2-acrylamido-2-methylpropanesulfonic acid (I), 25 mol % of [2-(methacryloyloxy)ethyl]dimethylamine (II) and 10 mol % of [3-(methacrylamino)propyl]trimethylammonium chloride (III).

Example A3

Stabilizer C

Using a procedure corresponding to Example 1, the stabilizer C was prepared as a copolymer from 65 mol % of 2-acrylamido-2-methylpropanesulfonic acid (I), 15 mol % of [2-(methacryloyloxy)ethyl]-tert-butylamine (II) and 20 mol % of [2-(acryloylamino)ethyl]trimethylammonium chloride (III).

Example A4

Stabilizer D

Using a procedure corresponding to Example 1, the stabilizer D was prepared as a terpolymer from 75 mol % of 2-acrylamido-2-methylpropanesulfonic acid (I), 20 mol % of [2-(methacryloyloxy)ethyl]diethylamine (II) and 5 mol % of [3-(methacryloylamino)propyl]trimethylammonium chloride (III).

Example A5

Stabilizer E

Using a procedure corresponding to Example 1, the stabilizer E was prepared as a terpolymer from 80 mol % of 2-acrylamido-2-methylpropanesulfonic acid (I), 15 mol % of [2-(methacryloyloxy)ethyl]-tert-butylamine (II) and 5 mol % of [2-(methacryloylamino)ethyl]trimethylammonium chloride (III).

The comminution properties and the drying times required are reported in Table 1. The residual moisture content of the milled powder is a measure of the completeness of the drying process.

TABLE 1

| | | Drying | | Residual moisture |
|---|---|---|---|---|
| | Gel properties | Temperature [° C.] | Time [min] | content [%] |
| Stabilizer A | Very hard Small free-flowing particles | 100 | 80 | 4 |
| Stabilizer B | Analogous to Example 1 | 90 | 100 | 6 |
| Stabilizer C | Analogous to Example 1 | 120 | 80 | 8 |
| Stabilizer D | Analogous to Example 1 | 100 | 70 | 4 |
| Stabilizer E | Analogous to Example 1 | 100 | 70 | 5 |

Solution viscosities of aqueous solutions are reported in Table 2.

TABLE 2

| | Viscosity of 1.0% solution [mPa * s]* | Viscosity of 2.0% solution [mPa * s]0* | Viscosity of 2.0% solution with 1% of Na$_2$SO$_4$ [mPa * s]* |
|---|---|---|---|
| Stabilizer A | 767 | 1630 | 753 |
| Stabilizer B | 845 | 1810 | 821 |
| Stabilizer C | 674 | 1334 | 662 |
| Stabilizer D | 910 | 1942 | 894 |
| Stabilizer E | 963 | 2014 | 948 |

*20° C., Brookfield, in H$_2$O (measured at 5 revolutions per minute)

Use Examples

The following examples illustrate the stabilizing action of the copolymers and terpolymers of the invention in respect of the segregation and flow properties of some concrete or mortar formulations.

The concretes were mixed in the laboratory using a 50 liter mechanical mixer. The efficiency of the mixer was 45%.

In the mixing of the self-compacting concretes, aggregates and flour-fine materials were firstly homogenized for 10 seconds in the mixer before the make-up water, the fluidizer and the stabilizer (as aqueous solution or as powder) were subsequently added. The mixing time was 4 minutes. The fresh concrete tests (slump flow, air pore content) were then carried out and evaluated. The change in consistency was observed over 120 minutes.

For tests on the self-compacting concrete, the following test equipment was used:

to determine the flowability, an Abrams cone slump funnel (internal diameter at the top=100 mm, internal diameter at the bottom=200 mm, height=300 mm) was used (slump=diameter of the concrete cake in cm measured along two mutually perpendicular axes and averaged).

The determination of the slump was carried out five times per mixture, at t=0, 30, 60, 90 and 120 minutes after the end of mixing, with the mixture being mixed again for 60 seconds by means of the concrete mixer before the respective slump determination.

The determination of the air pore content was carried out using an air pore pot (capacity: 8 liters) as described in DIN 1048 (part 1).

Bleeding (separation of water at the surface of the not yet cured building material) and segregation of the mixtures were assessed visually.

In the mixing of the concretes in accordance with DIN 1048 (part 1), aggregates and flour-fine materials were firstly homogenized for 10 seconds in the mixer before 13% by weight of the make-up water was subsequently added and the mixture was mixed for two minutes. The remaining water was subsequently added and the mixture was mixed for a further minute before the fluidizer and the stabilizer were added and the resulting mixture was likewise mixed for one minute.

The slump was determined in accordance with DIN 1048 (part 1) at t=0, 30, 60, 90 and 120 minutes after the end of mixing.

The cement-containing mortars and anhydrite flow screeds were mixed in the laboratory using a mortar mixer in accordance with DIN EN 196-1. Mixing was also carried out as described in DIN EN 196-1. The mixing time was 4 minutes. The slump (=diameter of the spread cake in cm) was determined using a Vicat ring as described in DIN EN 196 part 3 (internal diameter at the top=70 mm, internal diameter at the bottom=80 mm, height=40 mm) on a level, dry glass plate (the mixture was stirred up again with a spoon for 60 seconds before determination of the slump).

Kelco-Crete (welan gum) from CP Kelco, stabilizer ST 2 (cellulose ether) from Sika Addiment (Leimen) and the cellulose ethers Tylose H 20 P2 and Tylose MH 2000 YP2 (products of Clariant GmbH), Frankfurt, were used as comparative substances for comparison with the copolymers and terpolymers according to the invention.

Example B1

Self-Compacting Concrete with a Low Fine Particle Content

Comparison of conventional stabilizer and stabilizer according to the invention.

Formulations: fine particle content=450 kg/m$^3$ (cement+fly ash)

|  | Without stabilizer (comparison) | Kelco-Crete, commercial product of CP Kelco (comparison) | Inventive stabilizer A (according to the invention) |
| --- | --- | --- | --- |
| CEM I 42.5 R | 275 kg/m$^3$ | 275 kg/m$^3$ | 275 kg/m$^3$ |
| Sand (0-2 mm) | 868 kg/m$^3$ | 868 kg/m$^3$ | 868 kg/m$^3$ |
| Gravel (2-8 mm) | 330 kg/m$^3$ | 330 kg/m$^3$ | 330 kg/m$^3$ |
| Gravel (8-16 mm) | 538 kg/m$^3$ | 538 kg/m$^3$ | 538 kg/m$^3$ |
| Fly ash | 175 kg/m$^3$ | 175 kg/m$^3$ | 175 kg/m$^3$ |
| Melflux 2453 L [1] | 3.1 kg/m$^3$ | 3.1 kg/m$^3$ | 3.1 kg/m$^3$ |
| Stabilizers | — | 77.0 g/m$^3$ | 49.8 g/m$^3$ [2] |
| Water | 160 kg/m$^3$ | 160 kg/m$^3$ | 155 kg/m$^3$ |

[1] Product of Degussa Construction Polymers GmbH, Trostberg
[2] Addition as 1 mol % aqueous solution of the stabilizer A (the water content of the stabilizer is subtracted from the total make-up water).

As the results show (cf. FIG. 1), the processability is improved at a significantly lower added amount of the stabilizer according to the invention. The copolymer according to the invention gives a significantly more fluid mixture which displays very good processing properties even after some time. No separation of bleed water and no segregation are observed.

TABLE 3

Comparison of the concrete properties when using the conventional stabilizer and the inventive stabilizer A.

|  | Without stabilizer (comparison) | Kelco-Crete, commercial product of CP Kelco (comparison) | Inventive stabilizer A (according to the invention) |
| --- | --- | --- | --- |
| Bleeding | strong | none | none |
| Segregation | strong | none | none |
| Air pore content after 0 min | 1.7% | 2.1% | 1.7% |
| Air pore content after 30 min | 2.1% | 2.0% | 1.8% |
| Air pore content after 60 min | 2.2% | 2.3% | 1.7% |
| Air pore content after 90 min | 2.4% | 2.3% | 2.0% |
| Air pore content after 120 min | 2.8% | 2.5% | 2.1% |
| Compressive strength after 1 day | 6.3 N/mm$^2$ | 10.5 N/mm$^2$ | 11 N/mm$^2$ |
| Compressive strength after 7 days | 23.4 N/mm$^2$ | 39 N/mm$^2$ | 40 N/mm$^2$ |
| Compressive strength after 14 days | 37.5 N/mm$^2$ | 47 N/mm$^2$ | 49 N/mm$^2$ |
| Compressive strength after 28 days | 47.6 N/mm$^2$ | 55 N/mm$^2$ | 57 N/mm$^2$ |

The results show that the processability of the self-compacting concrete is improved when the inventive stabilizer A is added. The bending tensile strength and compressive strength are not adversely affected by the stabilizers according to the invention.

Example B2

Self-Compacting Concrete Having an Intermediate Fine Particle Content

Comparison of conventional stabilizer and stabilizer B according to the invention.

Formulations: fine particle content=505 kg/m³ (cement+ fly ash)

|  | Without stabilizer (comparison) | Kelco-Crete, commercial product of CP Kelco (comparison) | Inventive stabilizer B (according to the invention) |
| --- | --- | --- | --- |
| CEM I 42.5 R | 290 kg/m³ | 290 kg/m³ | 290 kg/m³ |
| Sand (0-2 mm) | 814 kg/m³ | 814 kg/m³ | 814 kg/m³ |
| Gravel (2-8 mm) | 343 kg/m³ | 343 kg/m³ | 343 kg/m³ |
| Gravel (8-16 mm) | 517 kg/m³ | 517 kg/m³ | 517 kg/m³ |
| Fly ash | 215 kg/m³ | 215 kg/m³ | 215 kg/m³ |
| Melflux 2453 L [1] | 3.3 kg/m³ | 3.3 kg/m³ | 3.3 kg/m³ |
| Stabilizer | — | 84.10 g/m³ | 53.9 g/m³ [2] |
| Water | 160 kg/m³ | 160 kg/m³ | 160 kg/m³ |

[1] Product of Degussa Construction Polymers GmbH, Trostberg
[2] Addition as 1 mol % aqueous solution of the stabilizer B (the water content of the stabilizer is subtracted from the total make-up water).

Figure 2:
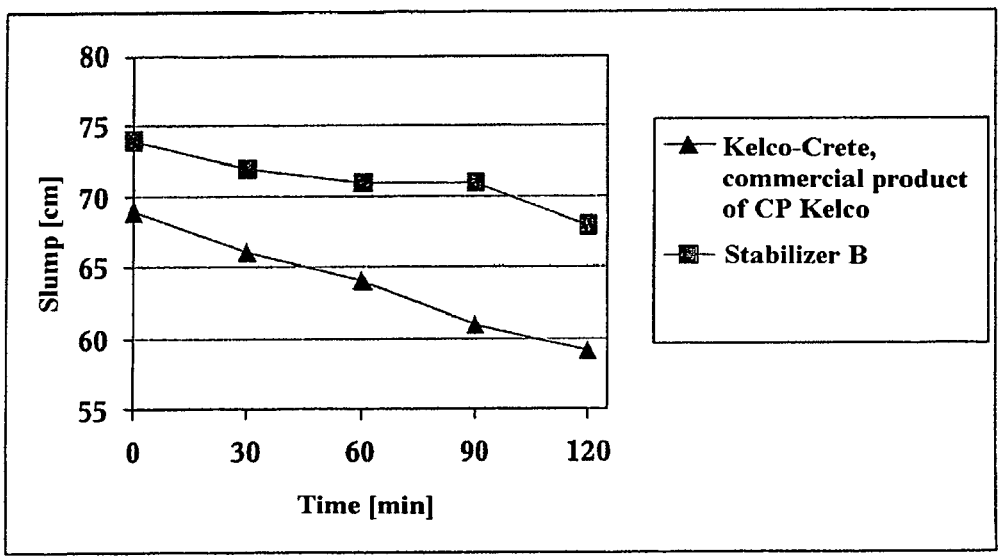

As the results show (cf. FIG. 2), the processability is improved at a significantly lower added amount when using the inventive stabilizer B. Separation of bleed water and segregation are not observed. The copolymer according to the invention gives a significantly more fluid mixture which displays very good processing properties even after some time.

TABLE 4

Comparison of the concrete properties when using the conventional stabilizer and the inventive stabilizer B.

|  | Without stabilizer (comparison) | Kelco-Crete, commercial product of CP Kelco (comparison) | Inventive stabilizer B (according to the invention) |
| --- | --- | --- | --- |
| Bleeding | strong | none | none |
| Segregation | strong | none | none |
| Air pore content after 0 min | 0.8% | 2.0% | 2.0% |
| Air pore content after 30 min | 1.2% | 2.2% | 1.9% |
| Air pore content after 60 min | 1.3% | 2.2% | 1.9% |
| Air pore content after 90 min | 1.7% | 2.4% | 2.0% |
| Air pore content after 120 min | 2.7% | 2.6% | 2.1% |
| Compressive strength after 1 day | 2.1 N/mm² | 15 N/mm² | 16 N/mm² |
| Compressive strength after 7 days | 35.6 N/mm² | 46 N/mm² | 46 N/mm² |
| Compressive strength after 14 days | 48.2 N/mm² | 53 N/mm² | 56 N/mm² |
| Compressive strength after 28 days | 55.7 N/mm² | 63 N/mm² | 64 N/mm² |

The results show that the processability of the self-compacting concrete is improved when the inventive stabilizer B is added. The bending tensile strength and compressive strength are not adversely affected by the stabilizers according to the invention.

Example B3

Concrete in Accordance with DIN 1048 (Part 1)

Comparison of conventional stabilizer and stabilizer C according to the invention.

Formulations:

|  | Without stabilizer (comparison) | Stabilizer ST 2, commercial product of Sika Addiment, Leimen (comparison) | Inventive stabilizer C (according to the invention) |
| --- | --- | --- | --- |
| CEM I 42.5 R | 295 kg/m³ | 295 kg/m³ | 295 kg/m³ |
| Sand (0-2 mm) | 402 kg/m³ | 402 kg/m³ | 402 kg/m³ |
| Gravel (2-8 mm) | 326 kg/m³ | 326 kg/m³ | 326 kg/m³ |
| Gravel (8-16 mm) | 1094 kg/m³ | 1094 kg/m³ | 1094 kg/m³ |
| Fly ash | 70 kg/m³ | 70 kg/m³ | 70 kg/m³ |
| Micro-Air [1] | 0.3 kg/m³ | 0.3 kg/m³ | 0.3 kg/m³ |
| Melflux 2453 L [2] | 2.4 kg/m³ | 2.4 kg/m³ | 2.4 kg/m³ |
| Stabilizer | — | 5.5 g/m³ | 1.28 g/m³ [3] |
| Water | 160 kg/m³ | 160 kg/m³ | 160 kg/m³ |

[1] Product of Masterbuilders Inc., Cleveland
[2] Product of Degussa Construction Polymers GmbH, Trostberg
[3] Addition as 1 mol % aqueous solution of the stabilizer C (the water content of the stabilizer is subtracted from the total make-up water).

TABLE 5

Comparison of the concrete properties when using the conventional stabilizer and the inventive stabilizer C.

|  | Without stabilizer (comparison) | Stabilizer ST 2, commercial product of Sika Addiment, Leimen (comparison) | Inventive stabilizer C (according to the invention) |
| --- | --- | --- | --- |
| Bleeding | strong | none | none |
| Segregation | strong | none | none |
| Slump after 0 min | 58 | 62 | 63 cm |
| Slump after 30 min | 55 | 58 | 60 cm |
| Slump after 60 min | 49 | 55 | 58 cm |
| Slump after 90 min | 45 | 50 | 54 cm |
| Slump after 120 min | 41 | 44 | 50 cm |
| Compressive strength after 7 days | 38.1 N/mm² | 41.4 N/mm² | 45.1 N/mm² |
| Compressive strength after 14 days | 48.8 N/mm² | 51.1 N/mm² | 52.5 N/mm² |
| Compressive strength after 28 days | 55.2 N/mm² | 57.5 N/mm² | 58.6 N/mm² |

The results show that the processability of the concrete is improved on addition of the inventive stabilizer C, since higher slumps without separation of bleed water and segregation are found. The bending tensile strength and compressive strength are not adversely affected by the stabilizers according to the invention.

Example B4

Grouting Mortar

Comparison of conventional stabilizer and stabilizer D according to the invention.

Formulations:

|  | Without stabilizer (comparison) | Tylose H 20 P2 product of Clariant GmbH, Frankfurt (comparison) | Inventive stabilizer D (according to the invention) |
| --- | --- | --- | --- |
| CEM I 52.5 R | 680.00 g | 680.00 g | 680.00 g |
| Standard sand (0-2 mm) [1] | 1445.00 g | 1445.00 g | 1445.00 g |

-continued

|  | Without stabilizer (comparison) | Tylose H 20 P2 product of Clariant GmbH, Frankfurt (comparison) | Inventive stabilizer D (according to the invention) |
|---|---|---|---|
| EFA Filler [2] | 51.00 g | 51.00 g | 51.00 g |
| CSA 20 [3] | 30.22 g | 30.22 g | 30.22 g |
| Cement/AL powder (995/5) [4] | 1.89 g | 1.89 g | 1.89 g |
| Melflux 1641 F [5] | 3.4 g | 3.4 g | 3.4 g |
| Stabilizer | — | 0.8 g | 0.2 g |
| Water | 217.6 g | 217.6 g | 217.6 g |

[1] In accordance with DIN EN 196-1
[2] Product of Bau Mineral, Herten
[3] Calcium sulfoaluminate, product of Denka, Japan
[4] Mixture of 995 parts by weight of CEM I 52.5 R and 5 parts by weight of Al powder (Standard SK I, product of Eckart, Fürth)
[5] Product of Degussa Construction Polymers GmbH, Trostberg

TABLE 6

Comparison of the mortar properties when using the conventional stabilizer and the stabilizer D according to the invention.

|  | Without stabilizer (comparison) | Tylose H 20 P2 product of Clariant GmbH, Frankfurt (comparison) | Inventive stabilizer C (according to the invention) |
|---|---|---|---|
| Bleeding | strong | none | none |
| Segregation | strong | none | none |
| Slump after 0 min | 33 cm | 27 cm | 29 cm |
| Slump after 30 min | 31 cm | 25 cm | 28 cm |
| Slump after 60 min | 26 cm | 23 cm | 26 cm |

The results show that the processability of the grouting mortar is improved when the inventive stabilizer D is added.

Example B5

Flow Screed Based on Synthetic Anhydrite

Comparison of conventional stabilizer and stabilizer E according to the invention.
Formulations:

|  | Without stabilizer (comparison) | Tylose MH 2000 YP2 product of Clariant GmbH, Frankfurt (comparison) | Inventive stabilizer E (according to the invention) |
|---|---|---|---|
| Synthetic anhydrite | 350.00 g | 350.00 g | 350.00 g |
| Standard sand (0–2 mm) | 402.70 g | 402.40 g | 402.55 g |
| Quartz Filler | 240.00 g | 240.00 g | 240.00 g |
| CEM I 42.5 R | 7.00 g | 7.00 g | 7.00 g |
| Melflux 1641 F [1] | 0.30 g | 0.30 g | 0.30 g |
| Stabilizer | — | 0.30 g | 0.15 g |
| Water | 170.00 g | 170.00 g | 170.00 g |

[1] Product of Degussa Construction Polymers GmbH, Trostberg

Figure 3:
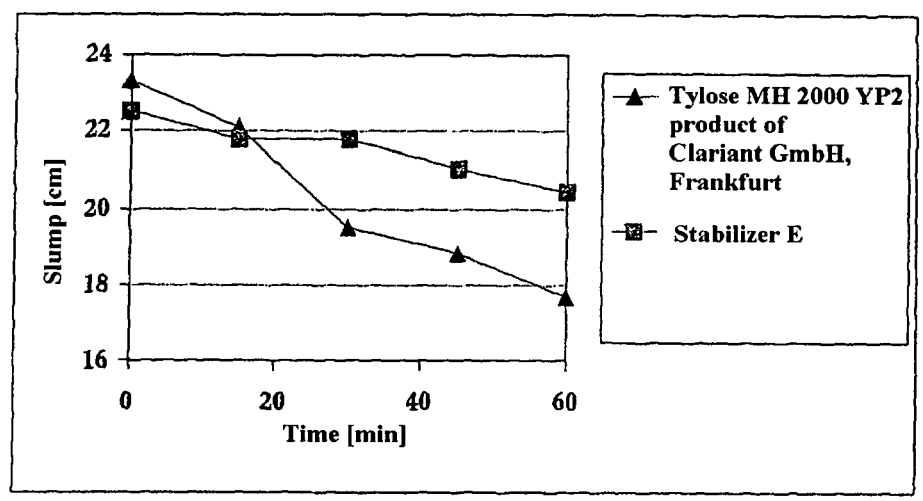

As the results show (cf. FIG. 3), the processability is improved when the inventive polymer is added.

TABLE 7

Comparison of the flow screed properties when using the conventional stabilizer and the stabilizer according to the invention.

|  | Without stabilizer (comparison) | Tylose MH 2000 YP2 product of Clariant GmbH, Frankfurt (comparison) | Inventive stabilizer E [1] (according to the invention) |
|---|---|---|---|
| Bleeding | strong | none | none |
| Segregation | strong | none | none |

The invention claimed is:

1. A composition that is an aqueous building material system, a water-based paint or coating system comprising a sufficient amount of a bipolymer or terpolymer to provide a stabilizing effect, wherein the bipolymer or terpolymer is water-soluble, contains sulfo groups and has a number average molecular weight of from 50,000 to 20,000,000 g/mol and consists of:

a) from 3 to 96 mol % of a structural group of formula I

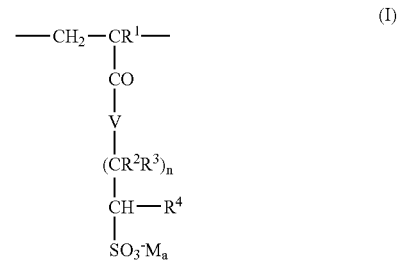

wherein $R^1$ is hydrogen or methyl, $R^2$, $R^3$, $R^4$ is hydrogen, an aliphatic hydrocarbon residue having from 1 to 6 carbon atoms, or a phenyl residue which may be unsubstituted or substituted by methyl groups, V is NH or oxygen, M is hydrogen, a monovalent or divalent metal cation, ammonium or an organic amine residue, n is from 1 to 5, A is ½ or 1, b) from 3 to 96 mol % of a structural group of formula II

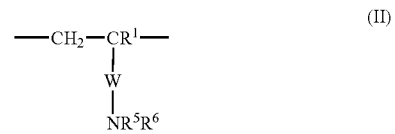

wherein W is —CO(O)—$(CH_2)_x$— or —CO—$NR^2$—$(CH_2)_x$—, x is from 1 to 6, $R^5$ and $R^6$ are independently hydrogen, a substituted or unsubstituted aliphatic hydrocarbon residue having from 1 to 20 carbon atoms, a cycloaliphatic hydrocarbon residue having from 5 to 8 carbon atoms, or an aryl residue having from 6 to 14 carbon atoms, and $R^1$ and $R^2$ are as defined above,
and/or
c) from 0.05 to 75 mol % of a structural group of formula III

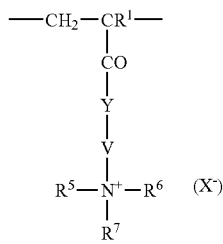

wherein Y is O, NH or $NR^5$,
V is $—(CH_2)_x—$,

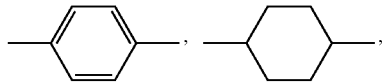

$R^7$ is $R^5$ or $R^6$, $—(CH_2)_x—SO_3^\ominus M_a$,

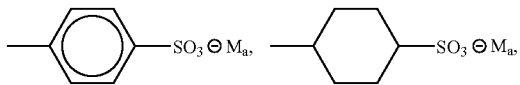

X is halogen, $C_1$-$C_4$-alkylsulfate of $C_1$-$C_4$-alkylsulfonate, and $R^1$, $R^5$, $R^6$, M, a and x are as defined above.

2. The composition as claimed in claim 1, wherein the copolymers and terpolymers are used in an amount of from 0.01 to 5% by weight, based on the dry weight of the building material system, paint system or coating system.

3. The composition as claimed in claim 1, wherein the aqueous building material systems comprises cement, lime, gypsum plaster, anhydrite, as hydraulic binders.

4. The composition as claimed in claim 1, wherein the copolymers or terpolymers are in the foiiii of an aqueous solution having a solids content of from 0.2 to 3% by weight.

5. The composition as claimed in claim 1, wherein the structural group a) of formula I is a 2-acrylamido-2-methyl-propanesulfonate.

6. The composition as claimed in claim 1, wherein the structural group a) of formula I is 2-acrylamido-2-methylpropanesulfonic acid sodium salt.

7. The composition as claimed in claim 1, wherein the structural group b) of formula II is [2-(methyacryloyloxy)-ethyl]-diethylamine.

8. The composition as claimed in claim 1, wherein the structural group c) of formula III is a [3-(methacryloylamino)-propyl]trimethlammonium salt.

9. The composition as claimed in claim 1, wherein the structural group c) of formula III is [3-(methacryloylamino)-propyl]trimethylammonium chloride.

10. A composition that is an aqueous building material system, a water-based paint or coating system comprising a sufficient amount of a biopolymer or terpolymer to provide a stabilizing effect, wherein the bipolymer or terpolymer is water-soluble, contains sulfo groups and has a number average molecular weight of from 50,000 to 20,000,000 g/mol and consists of:
   a) from 3 to 96 mol% of 2-acrylamido-2-methylpropane-sulfonic acid sodium salt, and
   b) from 0.05 to 75 mol% of [3-(methacryloylamino)-propyl]trimethylammonium chloride.

* * * * *